United States Patent [19]

Perkins

[11] Patent Number: 5,715,422
[45] Date of Patent: Feb. 3, 1998

[54] DATA-STORAGE AND PROCESSING CARD HAVING ON-BOARD DATA, PROCESSING INSTRUCTIONS, AND PROCESSING MEMORY

[75] Inventor: Carl Perkins, Irvine, Calif.

[73] Assignee: New Media Corp., Irvine, Calif.

[21] Appl. No.: 203,999

[22] Filed: Mar. 1, 1994

[51] Int. Cl.$^6$ .................................................. G06F 12/00
[52] U.S. Cl. ........................................ 395/428; 395/282
[58] Field of Search ................................. 395/325, 281,
395/282, 428, 280; 340/636, 825.44, 825.34;
365/194; 235/456

[56] References Cited

U.S. PATENT DOCUMENTS

| | | | |
|---|---|---|---|
| 4,366,509 | 12/1982 | Norrell et al. | 358/289 |
| 4,603,381 | 7/1986 | Guttag | 380/4 |
| 4,945,214 | 7/1990 | Hancock et al. | 235/456 |
| 5,018,146 | 5/1991 | Sexton | 371/37.1 |
| 5,204,663 | 4/1993 | Lee | 340/825.34 |
| 5,206,830 | 4/1993 | Isobe et al. | 365/194 |
| 5,289,342 | 2/1994 | Spalding et al. | 361/699 |
| 5,293,424 | 3/1994 | Holtey et al. | 380/23 |
| 5,333,277 | 7/1994 | Searls | 395/281 |
| 5,355,302 | 10/1994 | Martin et al. | 364/410 |
| 5,361,061 | 11/1994 | Mays et al. | 340/825.44 |
| 5,365,221 | 11/1994 | Fennell et al. | 340/636 |
| 5,430,681 | 7/1995 | Sugawara et al. | 365/222 |
| 5,438,671 | 8/1995 | Miles | 395/200.01 |

*Primary Examiner*—Jack B. Harvey
*Assistant Examiner*—Jeffrey K. Seto
*Attorney, Agent, or Firm*—Gregory Garmong

[57] ABSTRACT

A data-storage and processing card has a data-storage memory and a read/write memory. Data processing instructions are stored in the data-storage memory, along with the data. The data processing instructions require memory storage capacity for their execution, and the read/write memory is selected to be sufficiently large to meet this processing storage capacity requirement. To process the data, the card is plugged into a host computer, whose central processing unit recalls and executes the processing instructions. The read/write memory of the card is utilized as the required memory storage capacity for the processing. Alternatively, the card may include a central processing unit that processes the instructions. The card is particularly useful for storage of data compressed form and decompressing the data with data decompression processing instructions.

19 Claims, 2 Drawing Sheets

DATA-STORAGE AND PROCESSING CARD HAVING ON-BOARD DATA, PROCESSING INSTRUCTIONS, AND PROCESSING MEMORY

BACKGROUND OF THE INVENTION

This invention relates to computer data storage and processing, and, more particularly, to a plug-in data-storage and processing card that provides both data and certain processing instructions for the data, and the memory required to execute the processing instructions.

Hand-held or palmtop computers are becoming more widely used for specialized computing operations. The palmtop computer generally Includes all of the component functions found in larger computers, including a central processing unit, memory, a display, a keyboard, and input/output ports. However, because of its small size, the palmtop computer typically has smaller memory capacity, smaller displays and keyboards, and more rigidly defined input/output characteristics than larger computers.

In many instances, general purpose programming and program execution are not performed on a palmtop computer. Instead, the basic programming is performed elsewhere, and the results are stored on a data card having an acceptable palmtop format such as the PCMCIA (Personal Computer Memory Card International Association) card format. The data card is furnished to the palmtop user, who plugs it into the PCMCIA port on the palmtop computer. The preprogrammed instructions and/or operating data are read into the palmtop computer for simultaneous or later execution.

As palmtop computer applications become more sophisticated and complex, the memory requirements become greater. Although plug-in PCMCIA memory is available, an applications programmer writing for the palmtop computer can never be certain whether any particular palmtop computer will have sufficient memory available to execute the program being written. In many cases, the palmtop computer has only a single PC MCIA port, so that it is impossible to provide both a data card and an extended memory card to the palmtop computer at the same time.

An example is helpful in further developing the nature of the problem. Data can be stored on a data card in a highly compressed format. To utilize the data in the palmtop computer, a decompression program is required. Many decompression programs require relatively large memory capacity to store intermediate tables and other information. This memory capacity may be larger than required for most palmtop computing functions, and therefore it will not be available on most palmtop computers. If the palmtop computer is not provided with sufficient internal memory, the compressed-data card cannot be used with that particular palmtop computer.

There is a need for a systems architecture for palmtop computers whereby large, complex data-specific processing can be performed even with relatively small, inexpensive palmtop computers. The present invention fulfills this need, and further provides related advantages.

SUMMARY OF THE INVENTION

The present invention provides an apparatus and method for processing information requiring greater memory capacity than available in a palmtop or other type of limited-capacity computer. The approach gives great flexibility in programming and data provision, permitting the programmer to utilize highly sophisticated routines that are otherwise beyond the memory capability of the computer. Both data and processing instructions can be provided, and program execution is accomplished, even though only a single port is available on the computer.

In accordance with the invention, a data-storage and processing card comprises a substrate card and connector means for establishing an external connection to the substrate card, which resides on the substrate card. The substrate card also has memory means for storing information, including a data-storage memory containing data, and a read/write memory having a first quantity of memory storage capacity, the read/write memory being a separate memory from the data-storage memory. The card further has instruction means for processing the data, which requires a second quantity of read/write memory storage capacity for its execution. The second quantity of read/write memory storage capacity is no greater than the first quantity of read/write memory storage capacity. There also resides on the card communication means for communicating information between the connector means and the memories of the memory means.

In one form of the invention, the instruction means comprises a series of instructions stored in the memory means, and specifically the data-storage memory. These processing instructions can decompress the data when executed, with the read/write memory on the data card used to store intermediate results of the decompression routine as it runs. A preferred type of read/write memory for this application is a PSRAM.

Program execution can be accomplished by the central processor of the host computer, but with intermediate results stored in the read/write memory on the data card. Alternatively, the card itself may include a specialized central processing unit. In either case, there is a certainty of sufficient memory to execute the processing routine, because the required amount of memory is provided on the data card.

The approach of the invention provides in the data-storage and processing card a source of data and processing instructions, and also the memory required during the execution of the processing instructions with the data on the card. The card is therefore self-contained except for the central processing unit required to run the processing instructions. In one embodiment, even a specialized central processor can be provided on the card.

This approach provides an important advance in the art of small computers such as palmtop computers. Programmers can take great care In analyzing particular types of data and writing specialized processing instructions for that data. Once the specific data and processing instructions are known, the required memory for execution of the instructions will also be known. The data-storage and processing card is provided with exactly the amount of data memory, processing instruction memory, and memory for execution that is required.

To cite an example of interest to the inventor, a reference work might be stored in a data memory in highly compressed form. Such a reference work could be, for example, a catalog complete with extensive product descriptions and current pricing that is to be provided to all of a company's sales personnel for use on their palmtop computers. A decompression routine specific to, and optimized for, that reference work would be developed and stored on the same card. The reference work and the decompression instructions would typically be stored in a read-only memory on the card, so that they could not be unintentionally changed by the user.

From the development activity, the exact amount of memory required to execute the specific decompression routine on the specific data stored on the card would be known. That memory capacity, In the form of read/write random access memory, would also be provided on the card, so that no sales person would have a palmtop computer with insufficient memory capacity to perform the decompression routine on the reference information. The plug-in card with data, decompression routine, and required memory would be provided to the salesperson for later use. Only a single plug-in port is required In the computer for this card.

The present Invention provides an important advance in the art of small, limited-capacity computers. Applications-specific capability, beyond the normal capability of the computer, is provided in an easy-to-use format. The user need only plug in the card, and need not be concerned with details such as ensuring that the computer has the required memory capacity. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
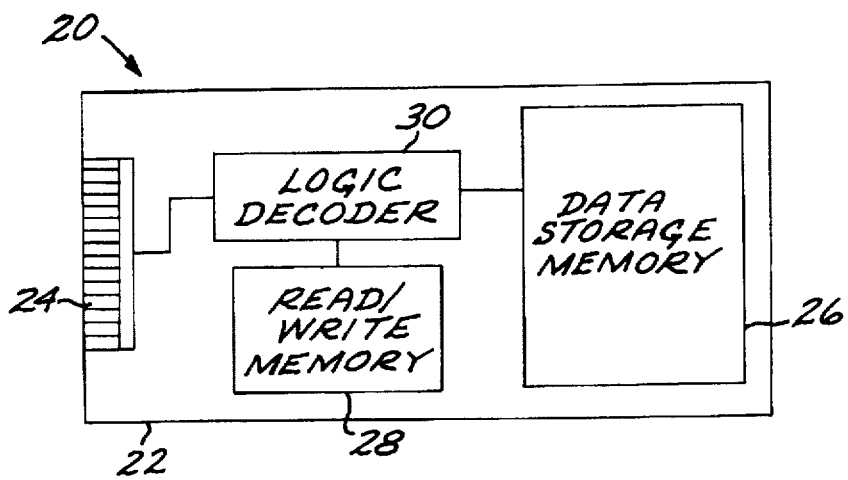
FIG. 1 is a schematic representation of a preferred data-storage and processing card of the invention.

FIG. 1 depicts a data-storage and processing card 20 according to a preferred embodiment of the invention. The card includes a substrate card Z Z upon which the other components are mounted. The substrate card Z Z is about the size of a credit card, and has dimensions of about 2.126 inches ×3.346 inches ×0.130 inches in size.

Residing on the substrate card 22 is a connector 24 that is configured to connect to a corresponding connector on a host computer. The connector is preferably a standard connector used in palmtop computers. As of the date of the invention, the connector 24 is an AMP, Inc. connector.

A data-storage memory 26 resides on the substrate card 22. The data-storage memory 26 is preferably of the read-only type for the preferred application. That is, Information is Initially stored in the data-storage memory 26 and can be recalled as needed by the user. The information in the data-storage memory cannot thereafter be overwritten by the user. Other types of memory can also be used, as desired for particularly applications of the card 20. For example, if the card 20 is to be used in a single fee-for-use application, a recall-once memory could be used. EPROM and Flash memories can also be used. All of these types of memories are currently available commercially. The preferred read-only memory is available as the LH53XXP00 series product from Sharp Electronics. The selected capacity of the data-storage memory depends upon the particular application of the card 20, and cannot be specified as a general matter. The approach to selecting the required capacity will be described subsequently.

A read/write memory 28 resides on the substrate card 22. The read/write memory 28 may be any type that permits writing to memory and reading from memory. The preferred type of memory unit used in the read/write memory 28 is a Pseudo-Static Random Access Memory (PSRAM). Other types of operable memory units include conventional Static Random Access Memory (SRAM) or Dynamic Random Access Memory (DRAM). The present invention is also operable with larger capacity memory units such as silicon hard disks or with read/write memory units that may be developed in the future. Some types of memory units such as PSRAM and DRAM require refreshing or other support functions, and the block "read/write memory 28" in FIG. 1 is understood to Include all such related functions, including memory control. In the present case, the preferred PSRAM used in the read/write memory 28 is available as the HM658512-CT series product from Hitachi. The read/write memory 28 has a first quantity of memory storage capacity. The selected capacity of the read/write memory 28 depends upon the particular application of the card 20, and cannot be specified as a general matter. The approach to selecting the required capacity will be described subsequently.

A logic decoder 30 resides on the substrate card 22. The logic decoder 30 is a logic device which decodes logical instructions transmitted through the connector 24 so as to effect communications with the data-storage memory 26 and the read/write memory 28. A command transmitted to the logic decoder 30 typically Includes a device identification (memory 26 or memory 28), whether information is to be read or written (read-only permitted for memory 26 in the preferred embodiment), and the information to be written or the identification of information to be read. In this embodiment, there is not provided any capability to process the information on the card 20. A preferred logic decoder 30 is available as the 3042 series product from Xilinx.

Figure 4:
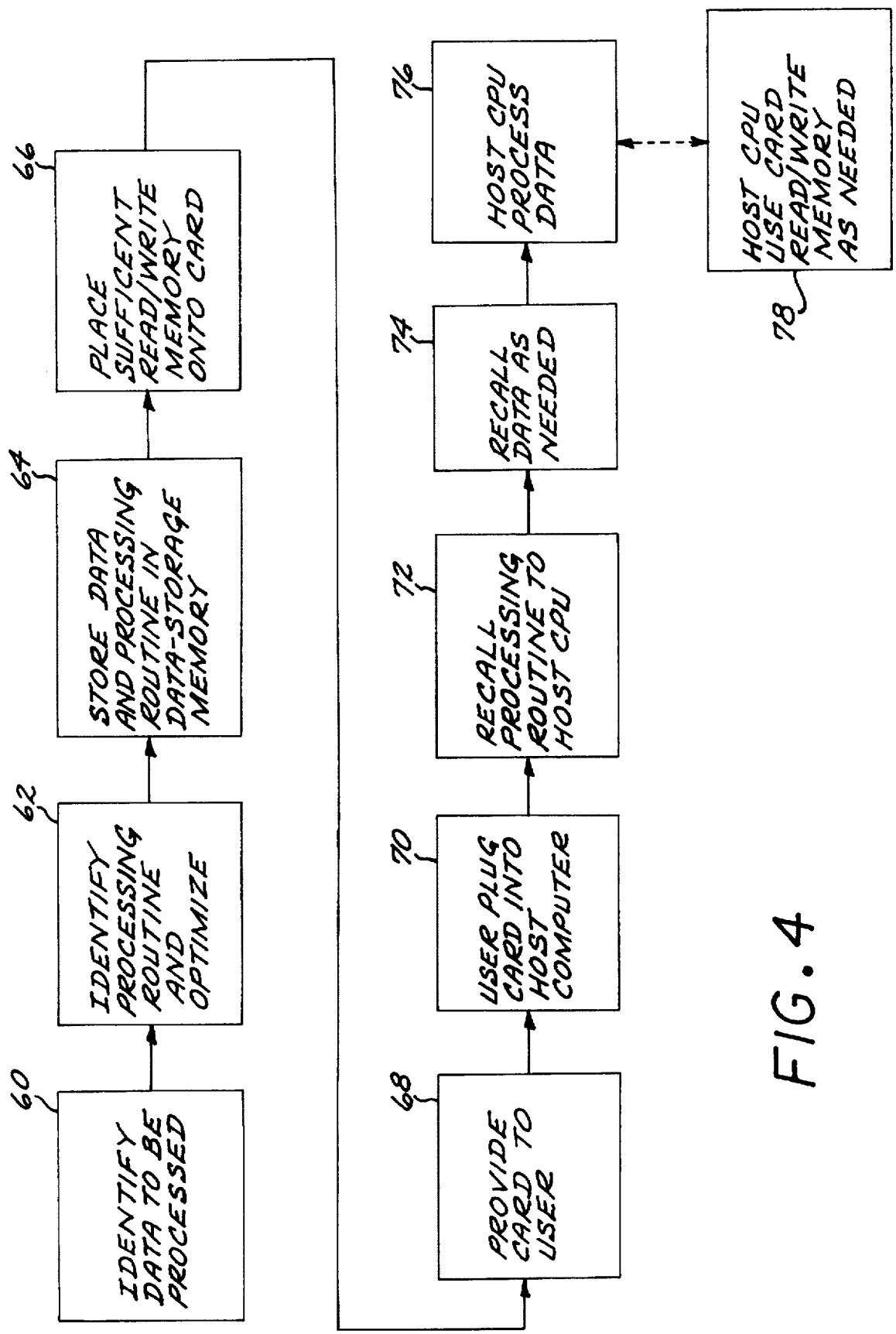
FIG. 4 is a block flow diagram for a method of processing information using the card of the invention.

Blocks 60–66 of FIG. 4 illustrate the approach to selecting memory capacities for the memories 26 and 28, and storing information in the memory 26. The data to be processed is identified, numeral 60. Continuing the example discussed in the Summary section, that data might be a catalog and pricing information to be used by salespeople who work at remote locations and do not have direct access to a central computer. In some cases that data may be so voluminous that it must be compressed using a custom data-compression process that is optimized for the particular data. In many situations, the efficiency of compression procedures is data dependent. The precise procedure is determined by trading off compression ratio with data tables required for decompression and CPU efficiency. When the user is to make use of the data, it must be first decompressed to conventional form. Thus, for the purposes of the present example, the "data to be processed" in block 60 is the compressed data.

A processing routine is identified and optimized, numeral 62. The processing routine is any set of instructions that are utilized by the palmtop computer to process the data. In the example, the processing routine is a decompression routine that transforms the data from the compressed to the decompressed form. The decompression routine is a set of instructions that accomplishes the processing of the data. The user of the palmtop typically not concerned with such a routine in using the data, and in fact may not be aware that the data was stored in a compressed form. Instead, the processing routine is written at the time the data is compressed, and can be carefully optimized for use on the palmtop by a highly skilled analyst. In preparing the processing routine, the analyst can determine that the processing routine requires a particular amount of memory during execution, here termed a "second quantity of read/write memory".

The data to be processed and the processing routine are stored in the data-storage memory 26, numeral 64. The capacity of the memory 26 therefore is selected to be sufficiently large to store this information.

Many processing routines, such as context-sensitive decompression routines, require extensive read/write memory to store intermediate results such as tables used in the decompression methodology. Palmtop computers and other small computers typically have limited internal storage capacity In their own read/write memories, and most of that memory is occupied with operating instructions and other information. Typically, little memory is available for complex applications. It therefore cannot be known with certainty by the analyst preparing the processing routine whether each users' palmtop computer will have the required memory for executing the processing routine. Some processing routines will require larger amounts of read/write memory, and others will require smaller amounts, and individual palmtop computers are typically not provided with sufficient internal read/write memory to execute complex routines such as data decompression routines.

The read/write memory 28 of the card 20 is therefore provided with sufficient memory capacity to execute the processing routine. Stated more precisely, the second quantity of read/write memory (required to execute the processing routine) is no greater than the first quantity of read/write memory (the capacity of the read/write memory 28). The capacity of the read/write memory 28 is therefore selected to be at least as great as that required to execute the processing routine, and a read/write memory 28 of that memory capacity is provided on the substrate card 22, numeral 66 of FIG. 4.

The data-storage and processing card 20 is complete and is provided to the user(s), numeral 68. This card 20 has the data to be processed, the instructions for processing the data (the decompression routine of the example), sufficient on-board read/write memory to ensure that the processing routine can be executed, logic to permit a host computer to interface with the memories 26 and 28, and a standard connector to the host computer. The card 20 is therefore a self-contained package in the sense that it contains everything except the central processing unit for processing the data.

Figure 2:
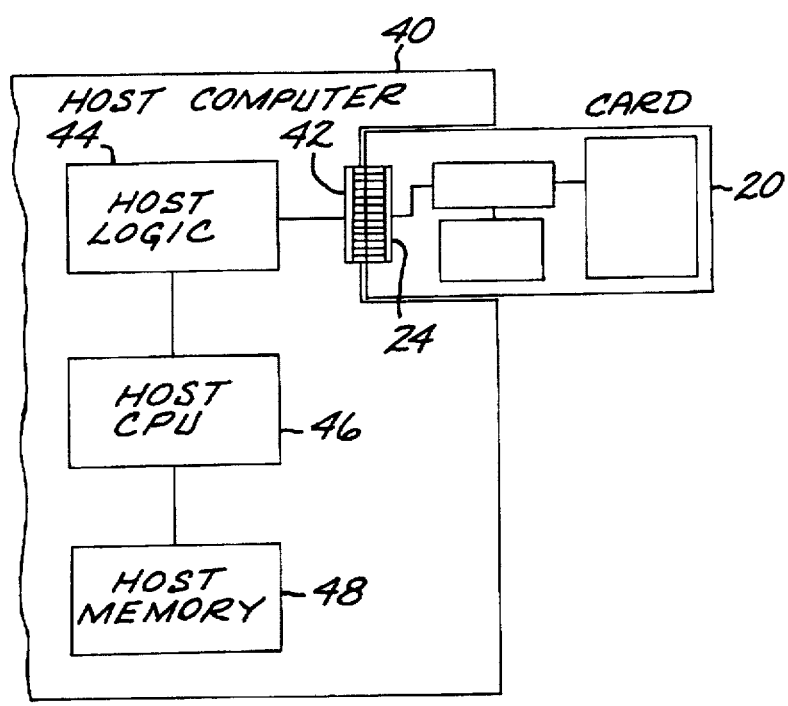
FIG. 2 is a schematic representation of the interaction of the card with a host computer.

To use the card 20, the user provides a host computer 40, shown in partial schematic form in FIG. 2, and plugs the connector 24 of the card 20 into a compatible connector 42 of the host computer 40, numeral 70 of FIG. 4. In the preferred embodiment, the host computer 40 is a palmtop computer. Examples of such palmtop computers, as of the filing of the present application, are the Hewlett Packard HP100 LX, the Apple Newton, and the Tandy Zoomer. The host computer 40 includes a standard host logic device 44 that operates in conjunction with the logic decoder 30 of the card 20 to communicate information back and forth between the computer 40 and the card 20. The computer 40 further includes a central processing unit (CPU) 46, and its own internal read/write host memory 48.

The user initiates the execution of the processing routine, typically by calling for presentation or use of the data stored in the data-storage memory 25. To execute the processing routine, the host CPU 46 recalls the processing routine from the data storage memory 26, numeral 72. The processing routine is executed, and data is recalled as needed from the data-storage memory 26, numeral 74. In the example, the processing routine is a decompression routine, and the data that is to be decompressed is recalled. As the processing routine is executed by the host CPU 46, numeral 76, intermediate results are written to, and recalled from, the read/write memory 28 of the card 20, numeral 78. Because the capacity of the memory 28 was selected to be sufficient to store these Intermediate results, the memory 28 is certain to be sufficient to permit the execution of the processing routine. In the example, the intermediate tables generated by the decompression routine are stored in the read/write memory 28.

The final results of the execution of the processing routine, the decompressed data in the example, are stored in the host memory 48. Thus, the host memory need only be large enough to store the final results, not the intermediate tables and the like. If desired, the memory 28 of the card 20 could be provided with sufficient capacity to store the final decompressed results as well.

Figure 3:
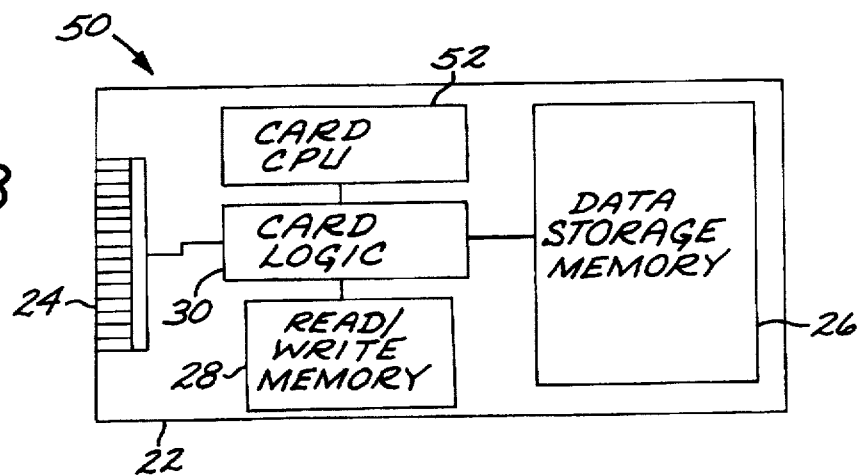
FIG. 3 is a schematic representation of an alternative embodiment of the card, having its own central processing unit.

FIG. 3 depicts another embodiment of the invention, a modified data-storage and processing card 50. The card 50 includes the same elements 22, 24, 26, and 28 as described earlier, and that description is incorporated here. Additionally, the card 50 includes a card central processing unit (CPU) 52 residing on the substrate card 22 and integrated with the memories 26 and 28, and with the host computer 40 (when plugged in) through the card logic 30. The card CPU 52 is a specially designed processor to execute all or a part of the processing routine onboard the card rather than in the host computer. The additional expense of the card CPU 52 may be justified when the processing routine requires a special capability. For example, the host CPU 46 may be an 8-bit processor, while a particular processing routine requires a 16-bit processor for efficient execution. In that case, the card CPU is provided, together with power lines and any other supporting structure required for its operation. A recommendation of whether to provide a card CPU 50 can be made by the analyst who prepares the processing routine and performs the other design functions discussed In relation to blocks 60–66 of FIG. 4.

The present invention provides a powerful plug-in card. The card is provided with the data to be processed and made available to the computer user. The card also has the processing routine and whatever memory and other capability are required above that routinely available In the computer, to execute the processing routine.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A data-storage and processing card, comprising:
   a substrate card;
   connector means for establishing an external connection to the substrate card, the connector means residing on the substrate card;
   memory means for storing information, the memory means residing on the substrate card, the memory means including
      a data-storage memory unit containing data, and
      a read/write memory unit having a first quantity of memory storage capacity, the read/write memory unit being a separate memory unit from the data-storage memory unit,
   instruction means for processing the data, the instruction means residing on the substrate card, the instruction means requiring a second quantity of read/write memory storage capacity for its execution, the second quantity of read/write memory storage capacity being no greater than the first quantity of read/write memory storage capacity; and communication means for communicating information between the connector means and the memorie means, the communication means residing on the substrate card.

2. The data-storage and processing card of claim 1, wherein the instruction means comprises a series of instructions stored in the memory means.

3. The data-storage and processing card of claim 2, wherein the instruction means is contained within the data-storage memory unit.

4. The data-storage and processing card of claim 1, wherein the instruction means comprises a series of instructions that decompresses the data when executed.

5. The data-storage and processing card of claim 1, wherein the instruction means comprises a series of instructions stored in the data-storage memory unit and wherein the series of instructions decompresses the data when executed.

6. The data-storage and processing card of claim 1, wherein the read/write memory unit is a PSRAM.

7. The data-storage and processing card of claim 1, further including a central processing unit in communication with the communication means.

8. The data-storage and processing card of claim 1, wherein the data-storage memory unit is a read-only memory.

9. The data-storage and processing card of claim 1, wherein the connector means comprises one side of a plug-in connector.

10. A data-storage and processing card, comprising:

a substrate card;

connector means for establishing an external connection to the substrate card, the connector means residing on the substrate card;

memory means for storing information, the memory means residing on the substrate card, the memory means including a read/write memory unit having a first quantity of memory storage capacity, and a data-storage memory unit containing data and a data-decompression routine that requires a second quantity of read/write memory storage capacity for its execution, the read/write memory being a separate memory unit from the data-storage memory unit; and communication means for communicating information between the connector means and the memory units of the memory means, the communication means residing on the substrate card.

11. The data-storage and processing card of claim 10, wherein the read/write memory unit is a PSRAM.

12. The data-storage and processing card of claim 11, further including a central processing unit in communication with the communication means.

13. The data-storage and processing card of claim 12, wherein the data-storage memory unit is a read-only memory.

14. A method for processing information, comprising the steps of:

providing a storage and processing card having a data-storage memory and a read/write memory residing on the card;

connecting the card to a host computer:

recalling a processing routine from the data-storage memory;

recalling data from the data-storage memory; and processing the data with the processing routine, the step of processing including the step of temporarily storing some information in the read/write memory.

15. The method of claim 14, wherein the step of providing includes the step of providing a data-storage memory that is a read-only memory.

16. The method of claim 14, wherein the step of recalling a processing routine includes the step of recalling a decompression routine.

17. The method of claim 14, wherein the step of recalling a processing routine includes the step of transferring the processing routine off the data-storage and processing card to the host computer, and wherein the step of processing the data includes the step of the host computer performing the processing routine and storing intermediate results in the read/write memory on the data processing and storage card.

18. The method of claim 14, wherein the step of processing the data includes the step of processing the data with a central processing unit residing on the data processing and storage card.

19. The method of claim 14, wherein the step of recalling a processing routine includes the steps of recalling a decompression routine, transferring the decompression routine off the data-storage and processing card to the host computer, and wherein the step of processing the data includes the step of the host computer performing the decompression routine and storing intermediate results in the read/write memory on the data processing and storage card.

* * * * *